United States Patent
Johnson et al.

(10) Patent No.: US 9,014,439 B2
(45) Date of Patent: Apr. 21, 2015

(54) OBLIQUE CENTERLINE FOLLOWING DISPLAY OF CT COLONOGRAPHY IMAGES

(75) Inventors: C. Daniel Johnson, Scottsdale, AZ (US); Michael J. Carston, Rochester, MN (US); Robert J. Wentz, Rochester, MN (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 1283 days.

(21) Appl. No.: 12/523,453

(22) PCT Filed: Jan. 22, 2008

(86) PCT No.: PCT/US2008/051676
§ 371 (c)(1),
(2), (4) Date: Jan. 27, 2010

(87) PCT Pub. No.: WO2008/089483
PCT Pub. Date: Jul. 24, 2008

(65) Prior Publication Data
US 2010/0142776 A1    Jun. 10, 2010

Related U.S. Application Data

(60) Provisional application No. 60/881,294, filed on Jan. 19, 2007.

(51) Int. Cl.
*G06T 19/00* (2011.01)

(52) U.S. Cl.
CPC ............. *G06T 19/00* (2013.01); *G06T 2200/24* (2013.01); *G06T 2210/41* (2013.01); *G06T 2219/008* (2013.01)

(58) Field of Classification Search
CPC . G06T 19/00; G06T 2200/24; G06T 2210/41; G06T 2219/008
USPC .................................................. 382/128, 260
See application file for complete search history.

(56) References Cited

U.S. PATENT DOCUMENTS

| | | | |
|---|---|---|---|
| 5,891,030 | A | 4/1999 | Johnson et al. |
| 5,913,820 | A | 6/1999 | Bladen et al. |
| 6,374,134 | B1 | 4/2002 | Bladen et al. |

(Continued)

FOREIGN PATENT DOCUMENTS

| WO | WO 2007/030132 | | 3/2007 |
|---|---|---|---|
| WO | WO 2008/089483 | A3 | 7/2008 |

(Continued)

OTHER PUBLICATIONS

Carston, Michael J. et al., "CT Colonography of the Unprepared Colon: An Evaluation of Electronic Stool Subtraction", SPIE Medical Imaging, vol. 5746, pp. 424-431, 2005.

(Continued)

*Primary Examiner* — Luke Gilligan
(74) *Attorney, Agent, or Firm* — Faegre Baker Daniels

(57) ABSTRACT

A method for displaying colonography images includes presenting a series of oblique images of the colon at sequential locations along the colon centerline. Each image is generally centered on the centerline, presents a field of view generally perpendicular to the centerline, and is oriented with the bottom of the colon down.

4 Claims, 2 Drawing Sheets

(56) References Cited

U.S. PATENT DOCUMENTS

| | | | |
|---|---|---|---|
| 6,516,212 | B1 | 2/2003 | Bladen et al. |
| 6,522,907 | B1 | 2/2003 | Bladen et al. |
| 6,757,557 | B1 | 6/2004 | Bladen et al. |
| 6,785,410 | B2 | 8/2004 | Vining et al. |
| 6,909,913 | B2 | 6/2005 | Vining |
| 6,928,314 | B1 | 8/2005 | Johnson et al. |
| 6,947,784 | B2 | 9/2005 | Zalis |
| 7,035,681 | B2 | 4/2006 | Johnson et al. |
| 7,149,564 | B2 | 12/2006 | Vining et al. |
| 7,174,202 | B2 | 2/2007 | Bladen et al. |
| 2006/0018549 | A1 | 1/2006 | Liang et al. |
| 2006/0023966 | A1* | 2/2006 | Vining ............ 382/260 |
| 2006/0047227 | A1 | 3/2006 | Jerebko |
| 2006/0270928 | A1 | 11/2006 | Geiger et al. |
| 2006/0280351 | A1* | 12/2006 | Luping et al. ........ 382/128 |
| 2007/0003131 | A1 | 1/2007 | Kaufman |
| 2007/0071297 | A1* | 3/2007 | Geiger et al. ........ 382/128 |
| 2007/0167722 | A1 | 7/2007 | Bladen et al. |
| 2008/0117210 | A1* | 5/2008 | Razeto et al. ........ 345/424 |
| 2008/0118117 | A1* | 5/2008 | Gauldie et al. ........ 382/128 |

FOREIGN PATENT DOCUMENTS

| | | | |
|---|---|---|---|
| WO | WO 2008/089489 | A2 | 7/2008 |
| WO | WO 2008/089490 | A2 | 7/2008 |
| WO | WO 2008/089492 | A2 | 7/2008 |

OTHER PUBLICATIONS

Cotton, Peter B. et al., "Computed Tomographic Colonography (Virtual Colonoscopy): A Multicenter Comparison With Standard Colonoscopy for Detection of Colorectal Neoplasia", JAMA, Apr. 14, 2004, vol. 291, No. 14, pp. 1713-1719.

Gatto, Nicolle M. et al., "Risk of Perforation After Colonoscopy and Sigmoidoscopy: A Population-Based Study", Journal of the national Cancer institute, vol. 95, No. 3, Feb. 5, 2003, pp. 230-236.

Iannaccone, Riccardo et al., "Computed Tomographic Colonography Without Cathartic Preparation for the Detection of Colorectal Polyps", Gastroenterology, vol. 127, pp. 1300-1311, 2004.

International Search Report and Written Opinion for PCT/US2008/051676, mailed Aug. 1, 2008, 10 pages.

International Search Report and Written Opinion for PCT/US2008/051699, mailed Jul. 11, 2008, 10 pages.

International Search Report and Written Opinion for PCT/US2008/051703, mailed Jul. 14, 2008, 9 pages.

International Search Report and Written Opinion for PCT/US2008/051710, mailed Jul. 30, 2008, 12 pages.

Jemal, Ahmedin et al., "Cancer Statistics 2003", CA Cancer J Clin 2003; 53:5-26.

Johnson, C. Daniel et al., "Prospective Blinded Evaluation of Computed Tomographic Colonography for Screen Detection of Colorectal Polyps", Gastroenterology 2003; 125:311-319.

Lakare, Sarang et al., "Electronic Colon Cleansing Using Segmentation Rays for Virtual Colonoscopy", SPIE Medical Imaging, vol. 4683 pp. 412-418, 2002.

Lakare, Sarang et al., "Robust Colon Residue Detection Using Vector Quantization Based Classification for Virtual Colonoscopy", SPIE Medical Imaging, vol. 5031, pp. 515-520, 2003.

Lieberman, David A. et al., "Use of Colonoscopy to Screen Asymptomatic Adults for Colorectal Cancer", The New England Journal of Medicine, vol. 343, Jul. 20, 2000, No. 3, pp. 162-169.

Pickhardt, Perry J. et al., "Computed Tomographic Virtual Colonoscopy to Screen for Colorectal Neoplasia in Asymptomatic Adults", The New England Journal of medicine, Dec. 4, 2003, vol. 349, No. 23, pp. 2191-2200.

Ristvedt, Stephen L. et al., "Patient Preferences for CT Colonography, Conventional Colonoscopy, and Bowel Preparation", The American Journal of Gastroenterology, vol. 98, No. 3, 2003, pp. 579-585.

Seeff, Laura C. et al., "Are We Doing Enough to Screen for Colorectal Cancer? Findings From the 1999 Behavioral Risk Factor Surveillance System", The Journal of Family Practice, vol. 51, No. 9, Sep. 2002, pp. 761-766.

Serlie, Iwo et al., "A Probabilistic Method for Virtual Colonoscopy Cleansing", SPIE Medical Imaging, vol. 5031, pp. 405-412, 2003.

Serlie, Iwo et al., "Computed Cleansing for Virtual Colonoscopy Using a Three-Material Transition Model", R.E. Ellis and T.M. Peters (Eds.): MICCAI 2003, LNCS 8979, pp. 175-183, 2003, © Springer-Verlag Berlin Heidelberg 2003.

Weitzman, Elissa R. et al., "Risk and Reluctance: Understanding Impediments to Colorectal Cancer Screening", Preventive Medicine 32, 502-513 (2001).

Winawer, Sidney J. et al., "Prevention of Colorectal Cancer by Colonoscopic Polypectomy", The New England Journal of Medicine, vol. 329, No. 27, Dec. 30, 1993, pp. 1978-1981.

Zalis, Michael E. et al., "Digital Subtraction Bowel Cleansing for CT Colonography using Morphological and Linear Filtration Methods", IEEE Transactions on Medical Imaging. vol. 23, pp. 1335-1343, 2004.

* cited by examiner

OBLIQUE CENTERLINE FOLLOWING DISPLAY OF CT COLONOGRAPHY IMAGES

REFERENCE TO RELATED APPLICATION

This application claims the benefit of U.S. provisional application Ser. No. 60/881,294, filed Jan. 19, 2007 and entitled Oblique Centerline Following Display Of CT Colonography Images, which is incorporated herein in its entirety by reference

GOVERNMENT LICENSE RIGHTS

This invention was made with government support under Government Contract No. CA075333 awarded by the National Cancer Institute. The government has certain rights in the invention.

TECHNICAL FIELD

The invention is a method and system for processing colonography image data and displaying colonography images.

BACKGROUND

Colonography, the use of electronic imaging technologies such as computed tomography (CT) to generate images of a patient's colon for purposes of colorectal cancer screening, is generally known. By way of example, these technologies are disclosed in the Johnson et al. U.S. Pat. Nos. 6,928,314 and 7,035,681, the Zalis U.S. Pat. No. 6,947,784, the Vining U.S. Pat. Nos. 6,909,913 and 7,149,564, and PCT publication no. WO 2007/030132, all of which are incorporated herein by reference. Briefly, this methodology involves obtaining a series of CT images of adjacent portions or slices of the colon. A radiologist then studies each of the images to identify any pre-cancerous polyps. Alternatively, a computer can effectively create a simulated intraluminal flight through the colon (this is also known as virtual colonoscopy). Colonography has been demonstrated to be a highly efficacious approach for detecting colorectal polyps.

Readers of CT colonography data sometimes prefer to maintain a small field of view, to maximize conspicuity of small polyps. However, this requires them to manually follow the colon throughout the abdomen and pelvis. Manually following the colon as it curves through the body can at times be difficult and may distract the reader from his or her primary task, which is to locate polyps and lesions within the colon. The reader may also sometimes recenter the segment of interest in the workstation display, further complicating the primary task. Conversely, the need for such recentering may be reduced if the image is viewed at a large field of view, but then any polyps may be more difficult to identify.

SUMMARY

The invention is an improved method and system for processing and displaying colonography image data. In one embodiment of the invention the image data is processed to identify a centerline of the colon. A series of oblique image data sets representative of images of the colon at sequential locations along the centerline is generated. Each image is generally centered on the centerline, presents a field of view generally perpendicular to the centerline and is oriented with the bottom of the colon down.

DESCRIPTION OF THE INVENTION

This invention is a display technique based on the automatic generation of a midline trace or centerline of the colon and then the display of a sequence of images that are centered on this trace, are perpendicular to it, and follow along it. This displays the colon in true cross section along its entire length, as if it had been straightened and sliced perpendicular to its long axis. Such a viewing technique can enhance the prominence of polyps sticking out into the lumen of the colon. The technique can help keep the observer's attention focused on the colon, and display the colon at an optimal size and in an optimal plane for lesion detection. This can result in faster reading times with less disruption of concentration, and may yield both time savings and improvements in accuracy.

Figure 1:
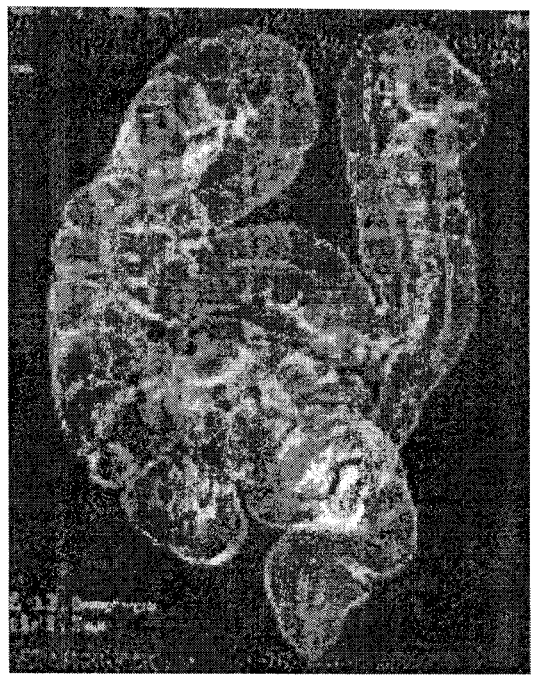
FIG. 1 is an image of a colon with a centerline traversing the length of the colon.

A centerline trace is shown in FIG. 1, and many techniques for generating such a trace are known and described in the literature. A small (and in some embodiments adjustable) field of view of an oblique slice through the data that is perpendicular to the trajectory of the centerline at this position is displayed around the current centerline position. The oblique slice is then rotated so that gravity points to the bottom of the image. This ensures a consistent orientation between slices, and also ensures that liquid content within the colon appears at the bottom of the image, where radiologists typically expect to see it.

Figure 2A:
FIGS. 2A-2C are oblique centerline-following and bottom down images of a colon at a series of sequential positions within the colon in accordance with one embodiment of the invention.
Figure 2B:
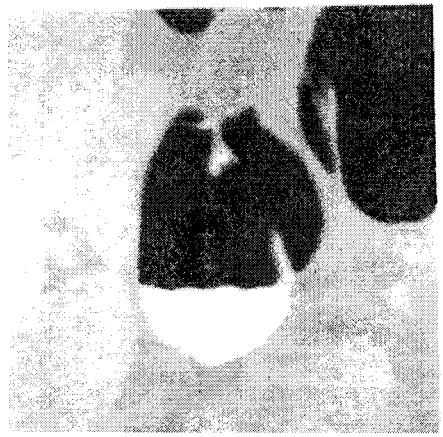
Figure 2C:

The radiologist controls the centerline position currently observed and field of view (e.g., the size of the field of view) with a mouse, slider bar or other keyboard or GUI control. As the radiologist advances through the centerline, the image shown is constantly updated to be from the slice corresponding to the current centerline position and centered on its location. FIGS. 2A-2C illustrate oblique centerline following, displaying sample views at three closely spaced points along the centerline in the transverse colon. As the radiologist scans along the centerline, the current centerline point (bright dot in the figure) remains at the center of the image, and a relatively small field of view is displayed around it, maintaining the current segment of interest in the center of the display. The images shown in FIGS. 2A-2C were generated at four point increments along the centerline, and have a field of view approximately 80 mm wide. Liquid stool contents always appears at the bottom of the images in FIGS. 2A-2C.

The field of view (FOV) is preferably large enough to show sufficient detail in the image, yet small enough so that the reader can view the image relatively quickly. The appropriate size FOV can be determined. Alternatively, GUI or other controls can be installed to make this adjustable by the user. Navigational aids to orient the user as to the current location, such as a full rendering of the colon (FIG. 1) with an arrow or marker showing the current position, can be included. The display system can automatically keep track of whether all necessary slices have been viewed, and alert the user when some areas of the colon have not been observed.

Figure 3:
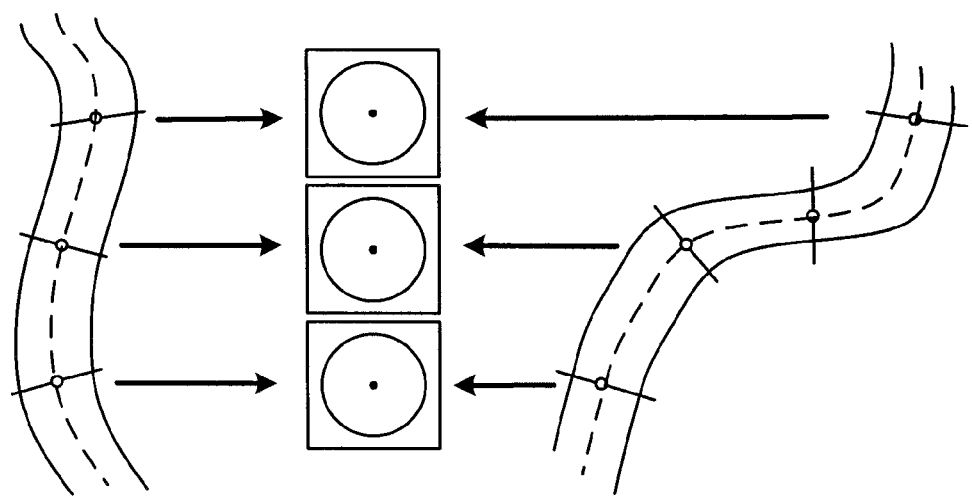
FIG. 3 is a schematic illustration of the imaging method of the invention.

FIG. 3 is a schematic illustration of oblique colon following in accordance with the invention. The images are generated orthogonal to the colon centerline and are centered on the lumen. The displayed images are rotated so that gravity points downward.

Although the invention is described with reference to preferred embodiments, those skilled in the art will recognize that changes can be made in form and detail without departing from the spirit and scope of the invention.

What is claimed is:

1. A method for operating a computer to process colonography image data, including:
    receiving colonography image data of a patient from a medical imaging device;
    processing the colonography image data by operating the computer to identify a centerline of the colon; and
    generating a graphical user interface by operating the computer, wherein the graphical user interface includes:
        a field of view control; and
        a rendering of the patient's colon and a colon image location control;
    receiving, by the computer, operator input field of view information representative of a desired field of view in response to an operator's actuation of the field of view control;
    receiving, by the computer, operator input colon image location information representative of a plurality of selected sequential locations along the colon in response to the operator's actuation of the colon image location control; and
    generating, by the computer, a marker on the rendering of the patient's colon in the graphical user interface corresponding to the colon locations selected by the operator's actuation of the colon image location control; and
    generating a series of oblique image data sets representative of two-dimensional images of the colon at the sequential locations represented by the operator input colon image location information and having a field of view size determined by the operator input field of view information using the computer, wherein the computer uses the identified centerline to cause each two-dimensional image to be generally centered on the centerline and to present a field of view generally perpendicular to the centerline, and the computer causes the data sets to represent the images oriented with the bottom of the colon in a down direction with respect to gravity.

2. The method of claim 1 and further including generating a colon image data set representative of a colon and having an indicia representative of the position of an image.

3. The method of claim 1 and further including displaying, on a monitor, a series of two-dimensional oblique images of the colon produced from the oblique image data sets, including updating the display to show the images corresponding to the sequential locations represented by the operator input information.

4. The method of claim 3 and further including presenting indicia of generated images that are not displayed on the monitor.

* * * * *